United States Patent [19]

Borle

[11] Patent Number: 5,394,860
[45] Date of Patent: Mar. 7, 1995

[54] METHOD OF CONNECTING A HEAT EXCHANGER TO A FORCED AIR FURNACE AND RELATED VALVE

[76] Inventor: Del Borle, R.R. #2, Leduc, Alberta, Canada, T9E 2X2

[21] Appl. No.: 243,129

[22] Filed: May 16, 1994

[51] Int. Cl.$^6$ ............................................. F24H 3/02
[52] U.S. Cl. ................................. 126/110 R; 126/80; 126/293; 126/110 A; 137/597; 165/901
[58] Field of Search ............... 126/112, 110 R, 85 B, 126/285 R, 290–293, 307 R, 312, 307 A, 99 R, 80, 99 A, 110 A; 237/51, 55; 165/901, 38; 137/876, 596, 597

[56] References Cited

U.S. PATENT DOCUMENTS

| 1,500,838 | 7/1924 | Miller | 165/901 |
| 1,547,781 | 7/1925 | Beers | 165/901 |
| 4,171,089 | 10/1979 | Schossow | 165/901 |

FOREIGN PATENT DOCUMENTS

| 1130233 | 5/1962 | Germany | 137/876 |
| 79046 | 2/1919 | Switzerland | 165/901 |

*Primary Examiner*—James C. Yeung
*Attorney, Agent, or Firm*—Anthony R. Lamber

[57] ABSTRACT

A method of connecting a heat exchanger to a forced air furnace is described. Firstly, connect a valve to the hot exhaust gas outlet of a furnace. The valve has a generally "L" shaped valve body. The valve body includes a primary passage. A diversion passage intersects the primary passage. A diversion return port intersects the primary passage downstream of the diversion passage. A butterfly valve member is pivotally mounted at the intersection of the primary passage and the diversion passage. The valve member has a first wing and a second wing. The valve has an open position and a closed position. The valve member is normally in the open position. Secondly, connect a fresh air outlet of a heat exchanger to a fresh air inlet on the furnace. Thirdly, connect the heat exchanger to the valve by using a first conduit to connect the diversion passage of the valve to an exhaust gas inlet of a heat exchanger, and a second conduit to connect the diversion return port of the valve to the exhaust gas outlet of the heat exchanger. An electric blower circulates exhaust gas through the first conduit and the second conduit upon activation of the furnace. Upon activation of the blower the valve member is drawn into the closed position by a forced circulation of exhaust gases by the blower out of the primary passage into the diversion passage and through the diversion return port into the primary passage.

2 Claims, 3 Drawing Sheets

METHOD OF CONNECTING A HEAT EXCHANGER TO A FORCED AIR FURNACE AND RELATED VALVE

The present invention relates to a method of connecting a heat exchanger to a forced air furnace and related valve.

BACKGROUND OF THE INVENTION

Heat exchangers have a hot fluid stream positioned adjacent to a relatively cool fluid stream. The proximity of the fluid steams results in a heat transfer occurring wherein the hot fluid stream loses a portion of its heat to the comparatively cool fluid stream. The heating system of a home could be made more efficient if air entering a forced air furnace was preheated by hot gases in the exhaust stream of the furnace through use of a heat exchanger. There has been a reluctance to equip residential furnaces with heat exchangers, however, due to safety concerns. Electric blowers are required to sustain movement of the hot exhaust gases from the exhaust stream through the heat exchanger and up the chimney. Should the electric blowers fail due to a power failure or mechanical problems, a build up of exhaust gases could result in the asphyxiation of the residents of the home.

SUMMARY OF THE INVENTION

What is required is a method of connecting a furnace to a heat exchanger which will address the above described safety concerns.

According to one aspect of the present invention there is provided a method of connecting a heat exchanger to a forced air furnace which includes the following steps as will hereinafter be described. Firstly, connect a valve to the hot exhaust gas outlet of the furnace. The valve has a generally "L" shaped valve body. The valve body includes a primary passage having an inlet and an outlet. A diversion passage intersects the primary passage. A diversion return port intersects the primary passage downstream of the diversion passage. A butterfly valve member is pivotally mounted at the intersection of the primary passage and the diversion passage. The valve member has a first wing and a second wing. The valve has an open position and a closed position. The valve member is normally in the open position. In the open position the first wing projects transversely across the diversion passage and the second wing projects transversely across the diversion return port. In the closed position the second wing is pivoted to block the primary passage. Secondly, connect a fresh air outlet of a heat exchanger to a fresh air inlet on the furnace. Thirdly, connect the heat exchanger to the valve by using a first conduit to connect the diversion passage of the valve to an exhaust gas inlet of a heat exchanger, and a second conduit to connect the diversion return port of the valve to the exhaust gas outlet of the heat exchanger. An electric blower circulates exhaust gas through the first conduit and the second conduit upon activation of the furnace. Upon activation of the blower the valve member is drawn into the closed position by a forced circulation of exhaust gases by the blower out of the primary passage into the diversion passage and through the diversion return port into the primary passage.

With the method, as described above, exhaust gases normally pass directly through the primary passage of the valve body. Upon the blower being activated, the exhaust gases are temporarily diverted through the heat exchanger. It is the activation of the blower that creates a forced circulation of air which alters the positioning of the butterfly valve member from a closed to an open position. The blower draws first wing of the valve member into the diversion passage. The valve member is maintained in that position by the continued flow of exhaust gases out of the primary passage into the diversion passage. At the same time a flow of exhaust gases acts upon the second wing of the valve member as the exhaust gases pass through the diversion return port into the primary passage.

According to another aspect of the present invention there is provided a valve which includes a generally "L" shaped valve body. The valve body includes a primary passage having an inlet and an outlet. A diversion passage intersects the primary passage. A diversion return port intersects the primary passage downstream of the diversion passage. A butterfly valve member is pivotally mounted at the intersection of the primary passage and the diversion passage. The valve member has a first wing and a second wing. The valve has an open position and a closed position. The valve member is normally in the open position. In the open position the first wing projects transversely across the diversion passage and the second wing projects transversely across the diversion return port. In the closed position the second wing is pivoted to block the primary passage.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
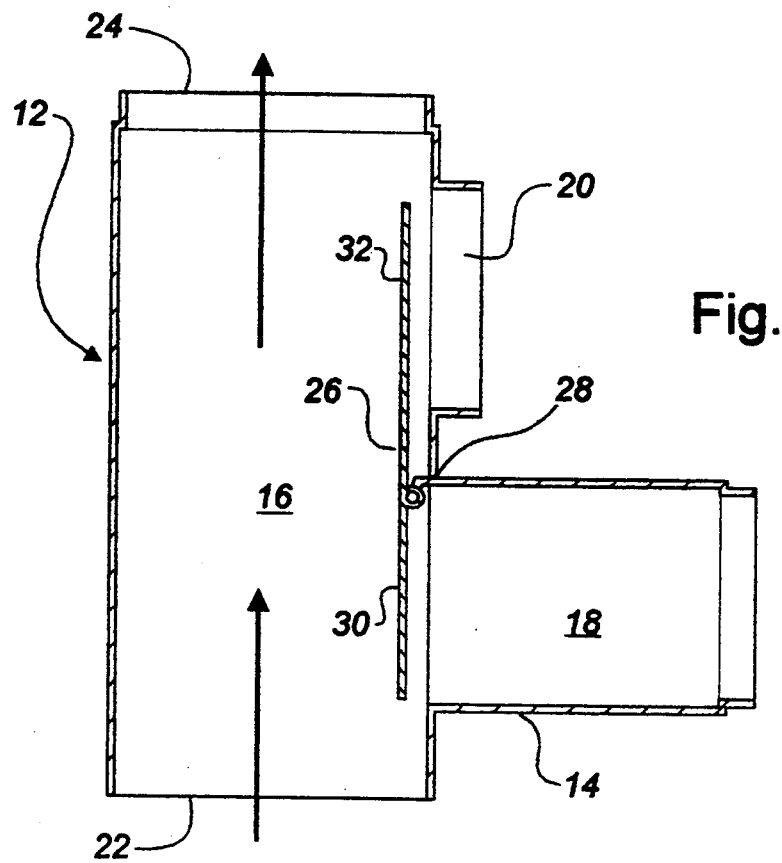
FIG. 1 is a side elevation view in longitudinal section of a valve constructed in accordance with the teachings of the present invention, in an open position.

The preferred embodiment, a method of connecting a heat exchanger to a forced air furnace generally identified by reference numeral 10, will now be described with reference to FIGS. 1 through 5.

Figure 2:
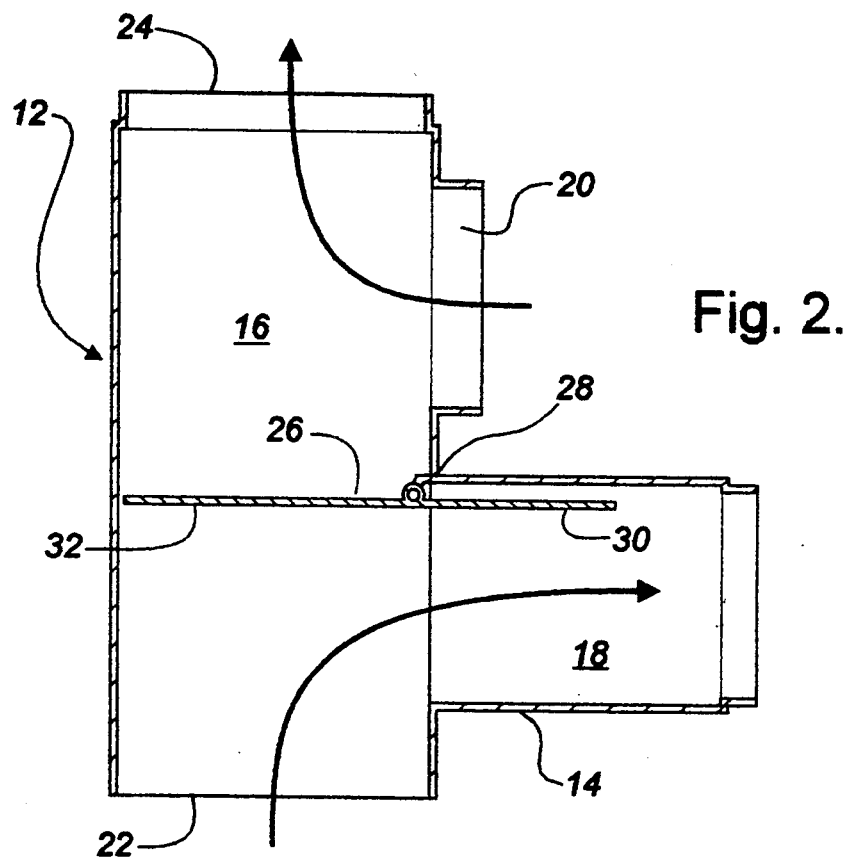
FIG. 2 is a side elevation view in longitudinal section of the valve illustrated in FIG. 1, in a closed position.

Fundamental to the method which will hereinafter be described is the use of a valve 12, illustrated in FIGS. 1 and 2. Valve 12 has a generally "L" shaped valve body 14. Valve body 14 has a primary passage 16, a diversion passage 18 and a diversion return port 20. Primary passage 16 has an inlet 22 and an outlet 24. Diversion passage 18 intersects primary passage 16 substantially at right angles. Diversion return port 20 also intersects primary passage 16, and is positioned parallel to and downstream of diversion passage 18. A butterfly valve member 26 is pivotally mounted at an intersection of primary passage 16 and diversion passage 18; such intersection being generally indicated by reference numeral 28. Valve member 26 has a first wing 30 and a second wing 32. Valve 12 has an open position as illustrated in FIG. 1, and a closed position as illustrated in FIG. 2. Valve member is counterbalanced to it normally rests in the open position illustrated in FIG. 1. The counterbalancing is accomplished by making first wing 30 heavier than second wing 32. When valve 12 is installed with primary passage 16 in a substantially vertical position, the weight of first wing 30 will cause valve member 26 to pivot to a substantially vertical position. Referring to FIG. 1, in the open position first wing 30 projects transversely across diversion passage 18 and second wing 32 projects transversely across diversion return port 20. Referring to FIG. 2, in the closed position first wing extends into and is substantially parallel to diversion passage 18 and second wing 32 is positioned transversely across primary passage 16, thereby diverting the flow of fluids from primary passage 16 to diversion passage 18.

Figure 3:
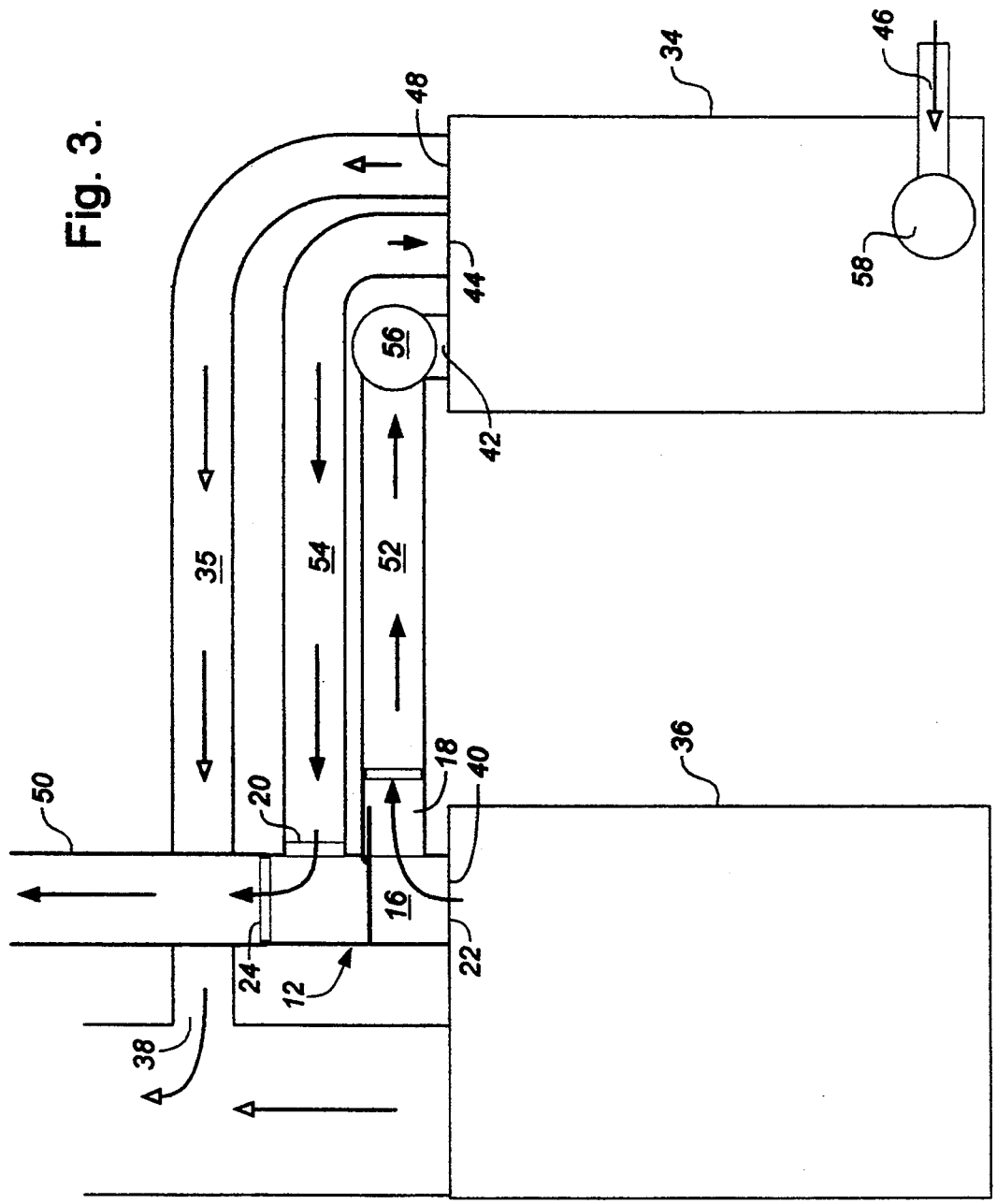
FIG. 3 is a side elevation view in longitudinal section of a method of connecting a heat exchanger to a forced air furnace using the valve illustrated in FIGS. 1 and 2.
Figure 4:
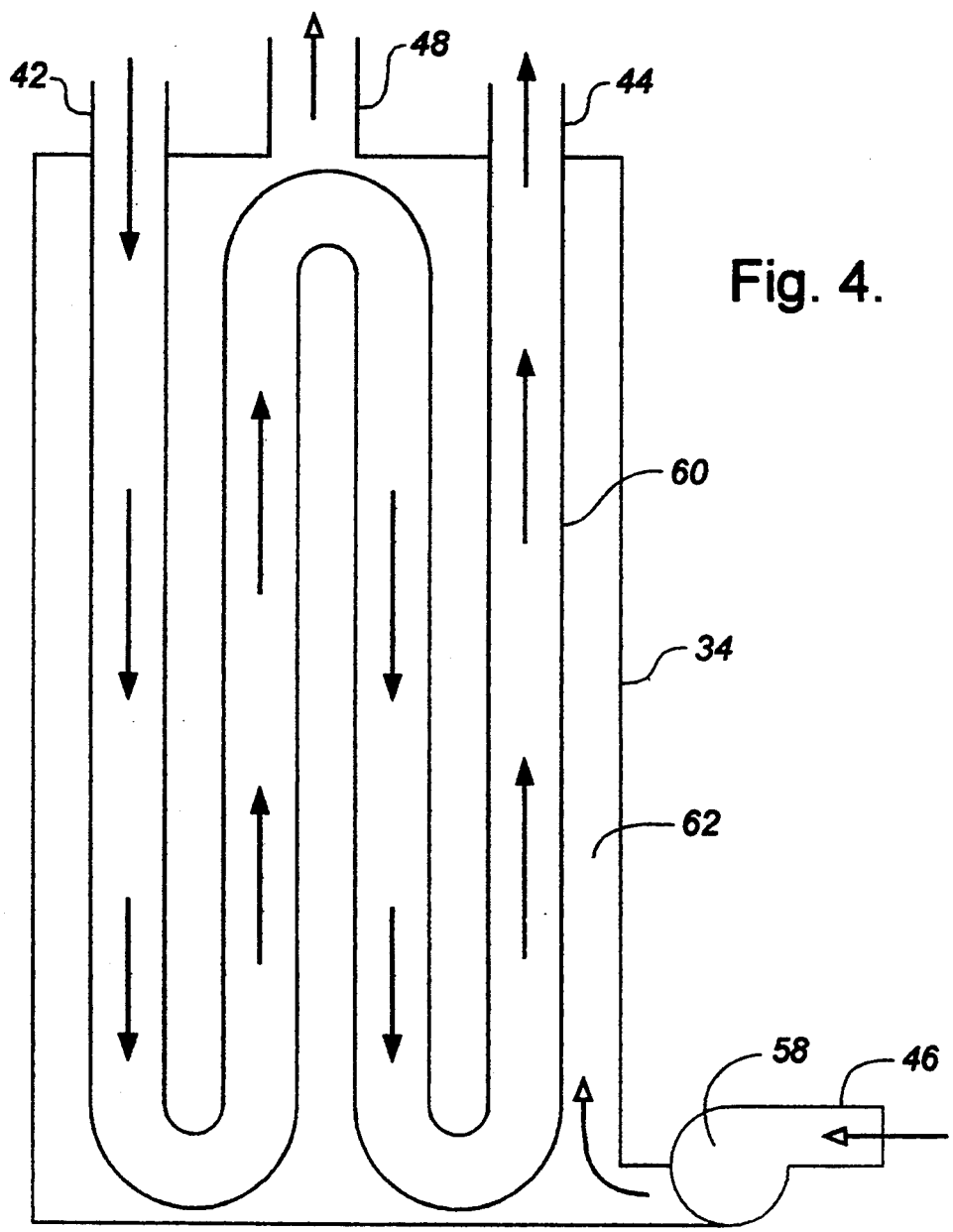
FIG. 4 is a side elevation view in longitudinal section of the heat exchanger illustrated in FIG. 3.
Figure 5:
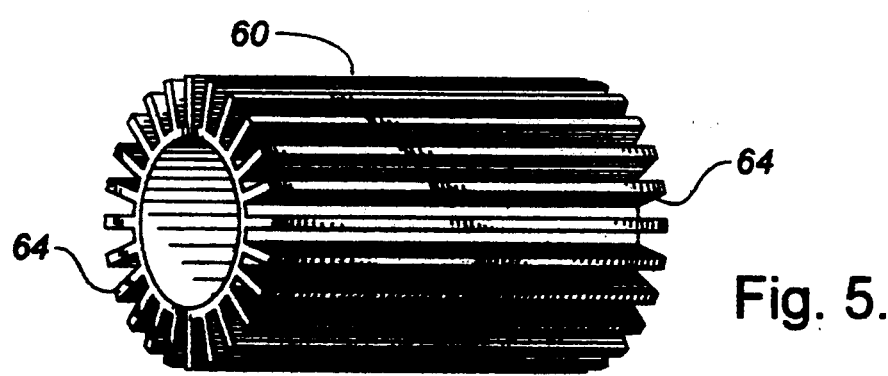
FIG. 5 is a detailed section view taken along section lines 5—5 of FIG. 4.

Referring to FIG. 3, in order for valve 12 to operate as intended, it is combined with a heat exchanger 34 and a forced air furnace 36. Forced air furnace 36 has a fresh air inlet 38 and an exhaust gas outlet 40. Heat exchanger 34 has an exhaust gas inlet 42, an exhaust gas outlet 44, a fresh air inlet 46 and a fresh air outlet 48. Inlet 22 of primary passage 16 on valve 12 is coupled to hot exhaust gas outlet 40 of forced air furnace 36. A thermal switch 37 is positioned in the vicinity of hot exhaust gas outlet 40. Outlet 24 of primary passage 16 on valve 12 is coupled to a chimney 50. Fresh air outlet 48 of heat exchanger 34 is connected by a conduit 35 to fresh air inlet 38 on forced air furnace 36. A first conduit 52 extends between diversion passage 18 of valve 12 and exhaust gas inlet 42 of heat exchanger 34. A second conduit 54 extends between diversion return port 20 of valve 12 and exhaust gas outlet 44 of heat exchanger 34. A first electric blower 56 is positioned first conduit 52 to circulate exhaust gases through heat exchanger 34. A second electric blower 58 is positioned at fresh air inlet 46 of heat exchanger 34 to circulate fresh air through heat exchanger 34. Referring to FIG. 4, the internal flow paths through heat exchanger 34 are illustrated, including a serpentine exhaust tube 60 which is contained in a housing 62 through which fresh air passes. Exhaust tube 60 is always surrounded by fresh air from housing 62 enabling a heat exchange to take place. Preferably, exhaust tube 60 has a plurality of fins 64 extending radially outwardly, as illustrated in FIG. 5 to facilitate the heat exchanger between the fluid streams.

The method of use and operation of the described combination will now be described with reference to FIGS. 1 through 5. When hot exhaust gases pass by thermal switch 37, electric blower 56 is activated. Upon electric blower 56 commencing to operate, suction from electric blower 56 exerts a force upon first wing 30 of valve member 26 urging it into the closed position as illustrated in FIG. 2. Once valve member 26 has moved into the closed position, the ongoing forced circulation of exhaust gases out of primary passage 16 into diversion passage 18 continues to act upon first wing 30 of valve member 26 to maintain valve member in the closed position. A flow of exhaust gases through diversion return port 20 into primary passage 16 exerts a force upon second wing 32 which also maintains valve member 26 in the closed position. The diverted exhaust gases pass through exhaust tube 60 of heat exchanger 34 enabling a heat exchange to take place. Also synchronized with electric blower 56, is electric blower 58 which creates a flow of fresh air through housing 62 of heat exchanger 34. The two adjacent flows result in an exchange of heat with the hot exhaust gases surrendering a portion of their heat to the relatively cool fresh air. The exhaust gases passing from diversion return port 20 into primary passage 16 have been stripped of their excess heat. The fresh air entering fresh air inlet 38 of forced air furnace 36 has been preheated. When the flow of hot exhaust gases past thermal switch 37 ceases, thermal switch 37 shuts electric blower 56 off. When electric blower 56 stops operating, member 26, being counterbalanced, will automatically return to the open position. In the event of a power failure or a malfunction of electric blower 56, valve member 26 will remain in the open position thereby directing hot exhaust gases directly to chimney 50.

It will be apparent to one skilled in the art that the described method of connecting furnace 36 to heat exchanger 34 by means of valve 12 addresses the safety concerns present in the prior art in a simple and cost effective manner. Should electric blower 56 malfunction, valve member 26 returns to an open position bypassing heat exchanger 36 and directing exhaust gases up chimney 50. It will be apparent to one skilled in the art that modifications may be made to the illustrated embodiment without departing from the spirit and scope of the invention as defined by the Claims. For example, blower 56 will operate just as effectively if positioned within second conduit 54.

The embodiments of the invention in which an exclusive property or privilege is claimed are as follows:

1. A method of connecting a heat exchanger to a forced air furnace, comprising the following steps:
   a. firstly, connecting a valve to a hot exhaust gas outlet of the furnace, the valve having a generally "L" shaped valve body, including;
      i. a primary passage having an inlet and an outlet;
      ii. a diversion passage that intersects the primary passage;
      iii. a diversion return port that intersects the primary passage downstream of the diversion passage;
      iv. a butterfly valve member pivotally mounted at the intersection of the primary passage and the diversion passage, the valve member having a first wing and a second wing, the valve having an open position and a closed position, the valve member normally being in the open position in which the first wing projects transversely across the diversion passage and the second wing projects transversely across the diversion return port, in the closed position the first wing extends into the diversion passage and the second wing is pivoted to block the primary passage;
   b. secondly, connecting a fresh air outlet of a heat exchanger to a fresh air inlet on the furnace; and
   c. thirdly, connecting the heat exchanger to the valve by using a first conduit to connect the diversion passage of the valve to an exhaust gas inlet of a heat exchanger, and a second conduit to connect the diversion return port of the valve to the exhaust gas outlet of the heat exchanger and positioning an electric blower to circulate exhaust gas through the first conduit and the second conduit upon activation of the furnace, such that upon activation of the blower the valve member is drawn into the closed position by a forced circulation of exhaust gases created by the blower out of the primary passage into the diversion passage and through the diversion return port into the primary passage.

2. In combination:
   a. a heat exchanger;
   b. a forced air furnace;
   c. a valve having a generally "L" shaped valve body coupled to a hot exhaust gas outlet of the furnace, the valve including;
      i. a primary passage having an inlet and an outlet;
      ii. a diversion passage that intersects the primary passage;
      iii. a diversion return port that intersects the primary passage downstream of the diversion passage;
      iv. a butterfly valve member pivotally mounted at the intersection of the primary passage and the diversion passage, the valve member having a first wing and a second wing, the valve having an open position and a closed position, the valve member normally being in the open position in which the first wing projects transversely across the diversion passage and the second wing projects transversely across the diversion return port, in the closed position the first wing extends into the diversion passage and the second wing is pivoted to transversely block the primary passage;
   d. a fresh air outlet of a heat exchanger connected to a fresh air inlet on the furnace;
   e. the heat exchanger coupled to the valve by a first conduit connected between the diversion passage of the valve and an exhaust gas inlet of a heat exchanger, and a second conduit connected between the diversion return port of the valve and the exhaust gas outlet of the heat exchanger; and
   f. at least one electric blower positioned in one of the first conduit and second conduit to circulate exhaust gas through the heat exchanger upon activation of the furnace, such that the blower draws the valve member into the closed position and maintains the valve member in the closed position by a forced circulation of exhaust gases with a flow of exhaust gases out of the primary passage into the diversion passage acting upon the first wing of the valve member and a flow of exhaust gases through the diversion return port into the primary passage acting upon the second wing of the valve member.

* * * * *